United States Patent [19]
Jacobs et al.

[11] Patent Number: 5,687,070
[45] Date of Patent: Nov. 11, 1997

[54] POWER FACTOR CONTROL FOR SWITCHED MODE RECTIFIERS

[75] Inventors: Mark Elliott Jacobs, Dallas; Yimin Jiang; Vijayan Joseph Thottuvelil, both of Plano, all of Tex.

[73] Assignee: Lucent Technologies Inc., Murray Hill, N.J.

[21] Appl. No.: 736,202

[22] Filed: Oct. 22, 1996

Related U.S. Application Data

[63] Continuation of Ser. No. 452,482, May 26, 1995, abandoned.

[51] Int. Cl.⁶ .............................. H02M 7/06; H02M 5/42; G05F 1/652
[52] U.S. Cl. ........................ 363/126; 363/89; 323/222
[58] Field of Search ........................ 323/222; 363/89, 363/46, 47, 48, 124, 126

[56] References Cited

U.S. PATENT DOCUMENTS

| | | |
|---|---|---|
| 4,677,366 | 6/1987 | Wilkinson et al. ............... 323/222 |
| 4,683,529 | 7/1987 | Bucher, II .......................... 363/44 |
| 5,001,620 | 3/1991 | Smith ................................. 363/89 |
| 5,012,058 | 4/1991 | Smith ................................. 363/98 |

OTHER PUBLICATIONS

Kelkar and Lee, "A Novel Input Filter Compensation Scheme for Switching Regulators", PESC, pp. 260–271, Jun. 14, 1982.

Kelkar and Lee, "Adaptive Input Filter Compensation for Switching Regulators", IEEE Trans. Aerospace and Electronic Systems, vol. AES–20, No. 1, pp. 57–66, Jan. 1984.

Todd, "UC3854 Controlled Power Factor Correction Circuit Design", Unitro Application Note, (Unitrobe Integrated Circuits of Merrimack, NH; Integrated Circuits/ U–134), pp. 10–303 through 10–322 May 1982.

Andreycak, "Optimizing Performance in UC3854 Power Factor Correction Applications", Unitro Design Note, (Unitrobe Integrated Circuits of Merrimack, NH; Integrated Circuits/ DN–39–E), pp. 10–527 through 10–531).

*Primary Examiner*—Peter S. Wong
*Assistant Examiner*—Bao Q. Vu

[57] ABSTRACT

A power factor correction system with an EMI input filter includes circuitry to sense the capacitor current of the filter to improve the accuracy of the power factor enhancement by providing a split current sensing resistor connected to the EMI filter or a voltage sensing capacitor. Both arrangements may be tightly coupled to the current control loop of the power factor control and compensate for the unsensed current in the EMI filter capacitors.

4 Claims, 8 Drawing Sheets

POWER FACTOR CONTROL FOR SWITCHED MODE RECTIFIERS

This application is a continuation of application Ser. No. 08/452,482, filed May 26, 1995 now abandoned.

FIELD OF THE INVENTION

This invention relates to control circuit improvements for power-factor-controlled switched-mode rectifiers (PFC SMRs) and in particular control circuits that enhance power factor by providing compensation for reactive currents in the differentially connected capacitors used in input EMI filters without introducing attendant control circuit instability.

BACKGROUND OF THE INVENTION

Power factor control for switched mode rectifies is a varied and active art driven to a large extent by the need to meet EMI standards. Most power factor controls use a feedback control which is sometimes combined with feed forward to meet rigid standards. The control circuit and process disclosed in U.S. Pat. No. 4,677,366 has achieved widespread usage and is described in a UNITRODE™ application handbook (1995–96). The process is implemented in the commercially available UC3854 type integrated circuit. Another power factor control circuit has been disclosed in U.S. Pat. No. 5,391,976. These exemplary power factor control circuits are quite effective in controlling the power factor when operated independently but their performance often deteriorates in practical circuits requiring significant EMI filtering at the power input by introducing instabilities into the power factor control circuit.

It is well known that SMRs intrinsically generate high levels of conducted noise currents on the input leads as a consequence of their high frequency switching operation, and this noise must be substantially attenuated to prevent interference with other electronic equipment. The admissible levels of conducted noise currents are described in national and international standards such as FCC Part 15, CISPR-22 and EN-55022. The design approach to limit conducted noise is to use a multi-stage low pass filter connected in series with the rectifier input leads.

This low pass filter is comprised of one or more inductors and one or more capacitors arranged to attenuate the high frequency components of the switching-induced currents while passing line frequency components with little distortion. To achieve high rectifier power conversion efficiency, the inductive and capacitive elements are designed with minimal parasitic resistance, resulting in a distinct resonance at a frequency roughly in the range of 5–20 kHz.

High power factor operation of the rectifier requires that the ac input line current be measured and the duty cycle of the rectifier high frequency switching process be controlled so that the ac input line current approximates a sinusoidal wave form in-phase with the ac line voltage. This current control process is designed with a bandwidth of 5 kHz or more so that a sinusoidal current wave form can be faithfully reproduced. The similar magnitudes of the resonant frequency of the low-pass input filter and the bandwidth of the current control process imply that precautions must be taken by the circuit designer to assure stable rectifier operation.

A typical prior-art circuit arrangement as described above, providing a dc output voltage, incorporates a boost-type power train combined with an input current EMI filter, and includes a control process to provide high power factor as shown in FIG. 1. This boost type power factor correction circuit is well known and its operation is well known to those skilled in the power factor correction art. Alternatively, other power train circuit topologies such as a SEPIC, buck-boost, flyback, etc., can be used.

A limitation of the circuit in FIG. 1 is the degradation of power factor as the load on the rectifier is reduced or the rectifier is operated at high ac input line voltage. This occurs because the voltage developed by the current sense resistor $R_{sense}$ does not measure the reactive input line current that flows through the EMI by-pass capacitors $C_1$ and $C_2$, and this current is not in-phase with the ac input line voltage. An improvement to the circuit would seem to be to relocate the resistor $R_{sense}$ to the left of $C_2$ as shown on FIG. 2 to account for the line frequency current through $C_2$ in the control process. However, relocating $R_{sense}$ as shown on FIG. 2 introduces a control loop instability which can be understood as follows: The low-pass EMI filter and the sense resistor arranged as shown on FIG. 1 introduce a left-half plane double zero followed by a double pole in the control loop s-plane, all near 10 kHz; these do not necessarily cause control loop instability because the leading phase of the double zero is encountered at a lower frequency than the double pole on the Bode plots of FIGS. 3 and 4. In the arrangement shown on FIG. 2, a double pole is introduced near the intended cross-over frequency for the control loop, causing a potential instability which can be difficult to mitigate.

The arrangement on FIG. 1 permits a control loop bandwidth of at least 10 kHz, whereas the arrangement on FIG. 2 generally requires a bandwidth of 1 kHz or less to achieve the required design margins for loop stability, which is too low a frequency for faithful sinusoidal input current reproduction. Control-loop Bode plots for the circuit arrangements described by FIGS. 1 and 2 are shown in FIGS. 3, 4, 5, and 6 respectively, demonstrating the adverse effect caused by a sense resistor located to the left of capacitor $C_2$. (On FIGS. 5 and 6 the discontinuity in phase at about 12 kHz is caused by limiting of the plotted phase angle by the plotting program to + or −180°.)

In the prior art arrangements as discussed above the power factor control does not accurately account for the current in the capacitors of the EMI filter at the input of the converter. These capacitor cents vary with the AC line voltage, and accurate power factor correction requires that they be included in the control process.

SUMMARY OF THE INVENTION

Therefore in accord with the invention a power factor control circuit is provided as recited in the claims.

In one particular embodiment the invention contemplates providing split current sensing resistors located with the EMI filter where it may be tightly coupled to the current control loop of the power factor control. The invention also contemplates a capacitive sensing of the AC line voltage to provide an accurate compensation for capacitor current of the EMI filter.

In one illustrative embodiment disclosed herein, a voltage sensing connection utilizes a small capacitor connected to the AC line to supply a capacitor voltage sense signal to the input current sense amplifier of the power factor control circuit. This voltage sense signal is added to the signal representing the current sensed by the current sense resistor. This allows the current control loop to more accurately control the total current drawn by the rectifier, regardless of the load magnitude.

In yet another embodiment the capacitor voltage sense signal is filtered to reduce noise, without adversely affecting rectifier stability.

DETAILED DESCRIPTION

Figure 7:
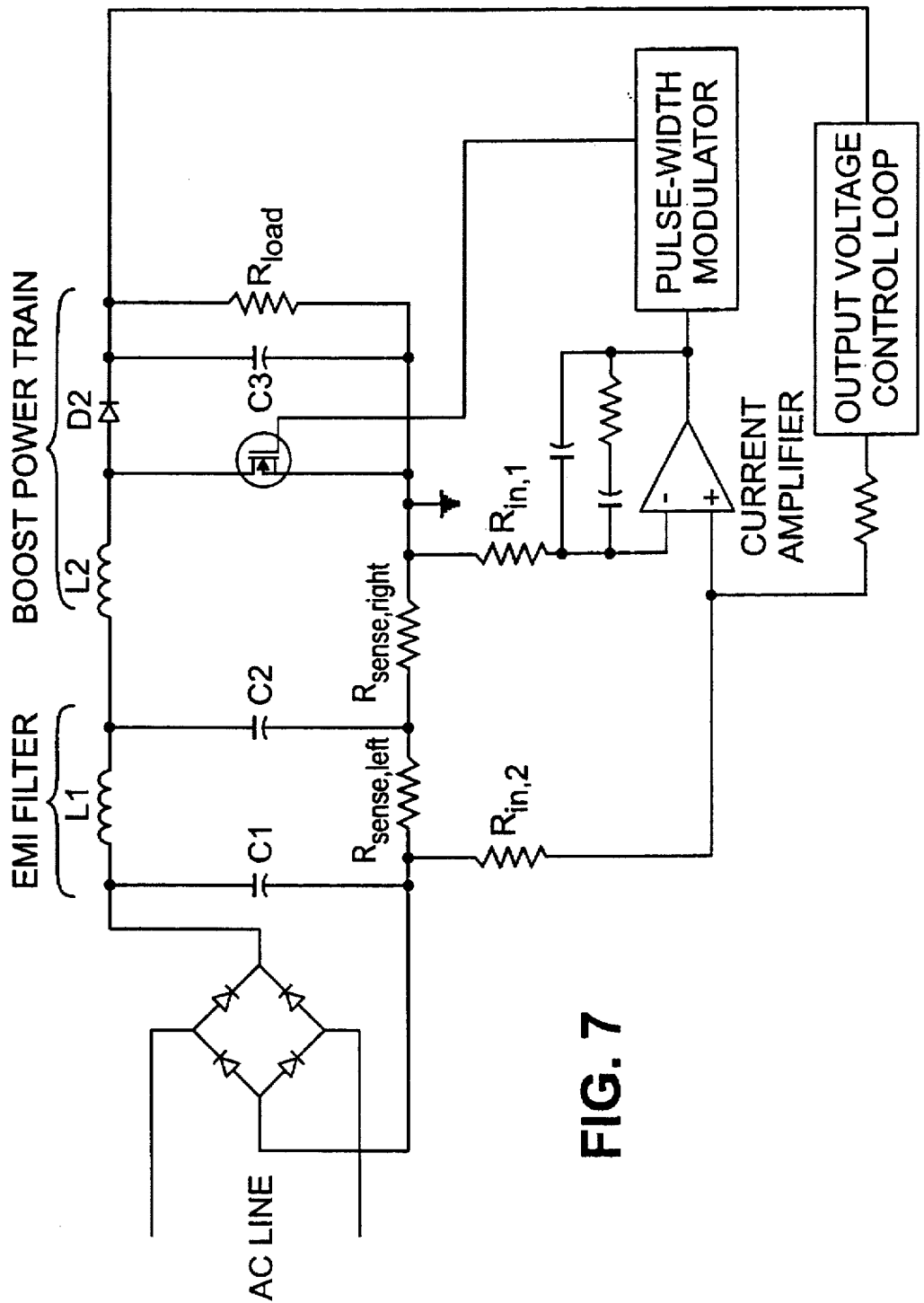
FIG. 7 is a circuit schematic of a power factor control arrangement using two current-sense resistors located with respect to capacitor 2 in accord with the invention.

In FIG. 7 an EMI$\pi$ filter is connected to receive a DC voltage from an AC line energized rectifier. The EMI filter has a series filter inductor $L_1$ and two capacitor legs having the two capacitors $C_1$ and $C_2$ respectively. The EMI filter is followed by a boost power train having a boost inductor $L_2$, a FET power switch and an output rectifier diode D1 connected to an output filter capacitor $C_3$ and the $R_{load}$. Two current sensing resistors $R_{sense,left}$ and $R_{sense,right}$ are connected on different sides of the second leg of the filter. Current sensed by these resistors is applied to a current amplifier which also has an input from a output voltage control loop. The output of the current amplifier drives a pulse width modulator which in turn controls the FET power switch.

Figure 1:
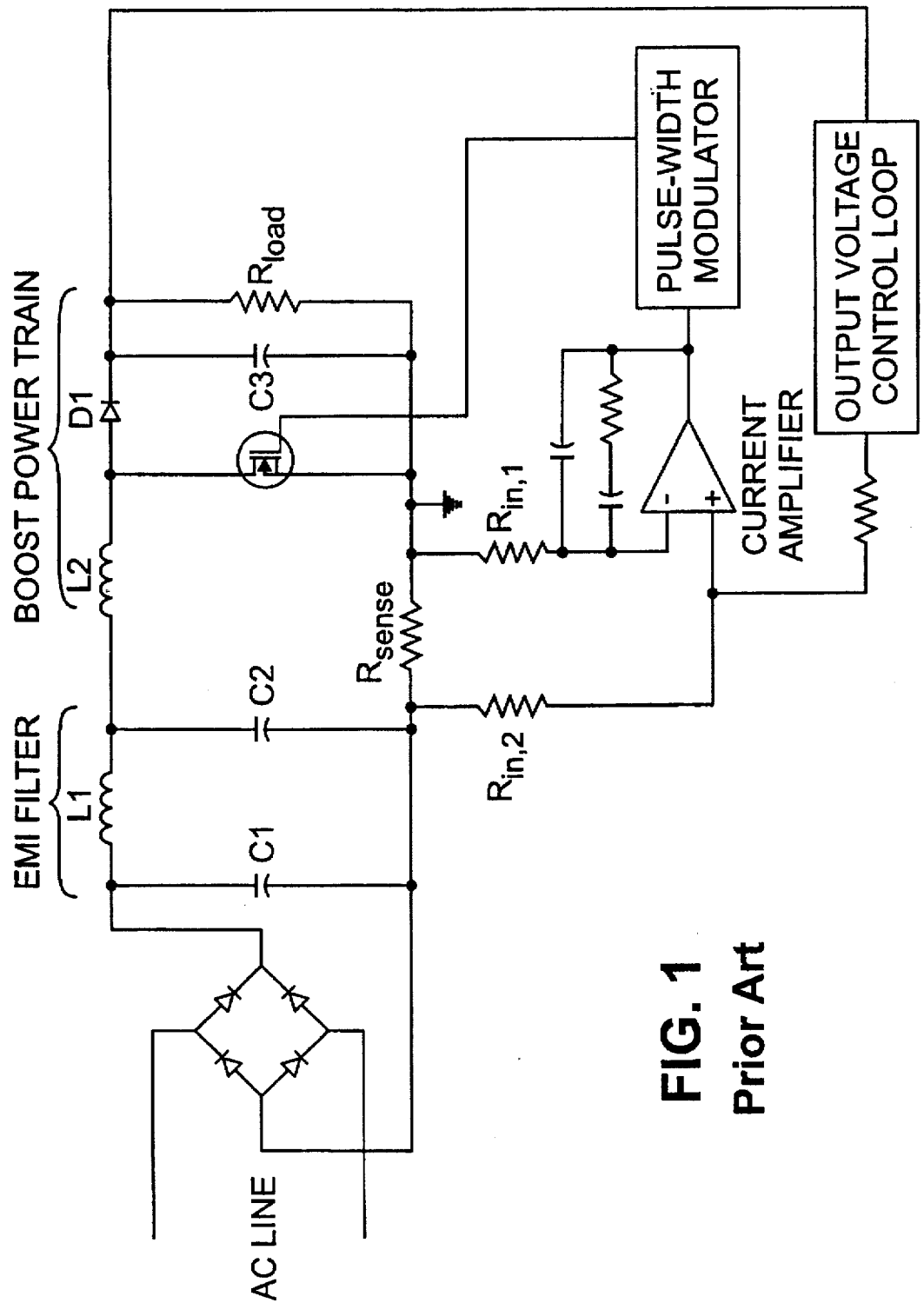
FIG. 1 is a schematic of a prior-art high power factor boost circuit including an EMI filter and a feedback control.
Figure 2:
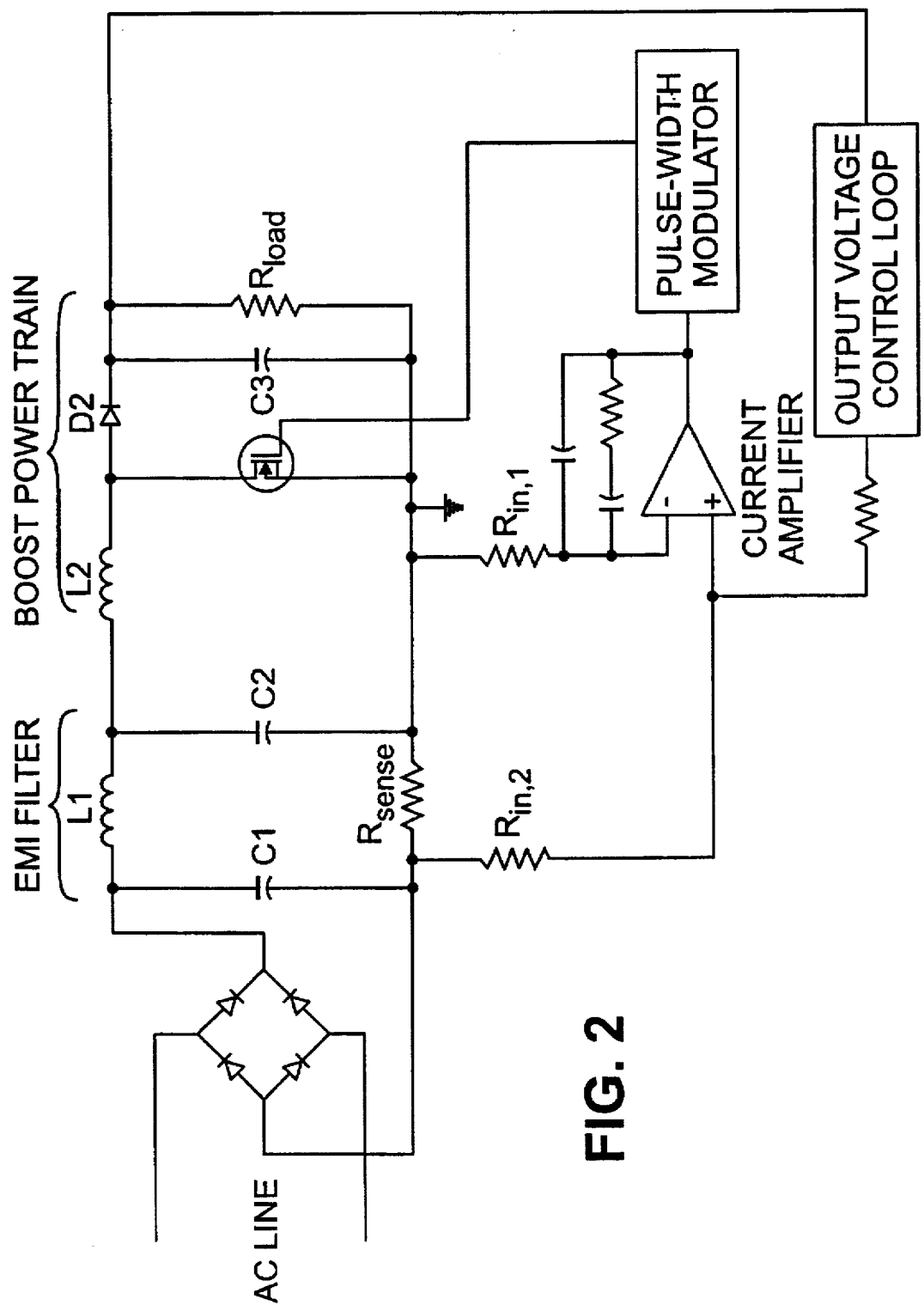
FIG. 2 is a schematic of a boost circuit as above but with the current-sense resistor located to the left of the capacitor 2.
Figure 3:
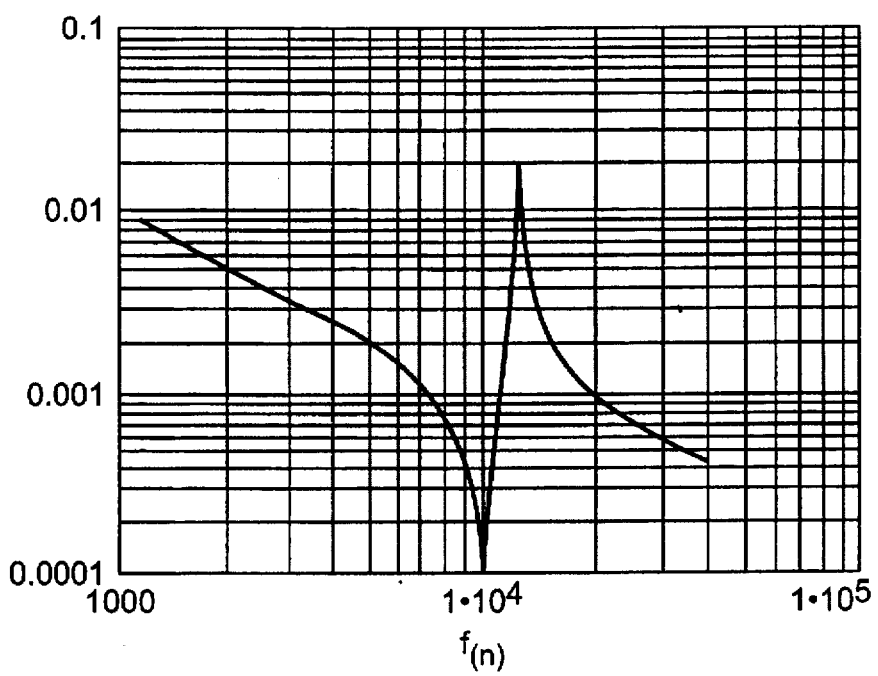
FIGS. 3 and 4 are graphs of Bode plots of frequency responses of the feedback control circuitry of FIG. 1.
Figure 4:
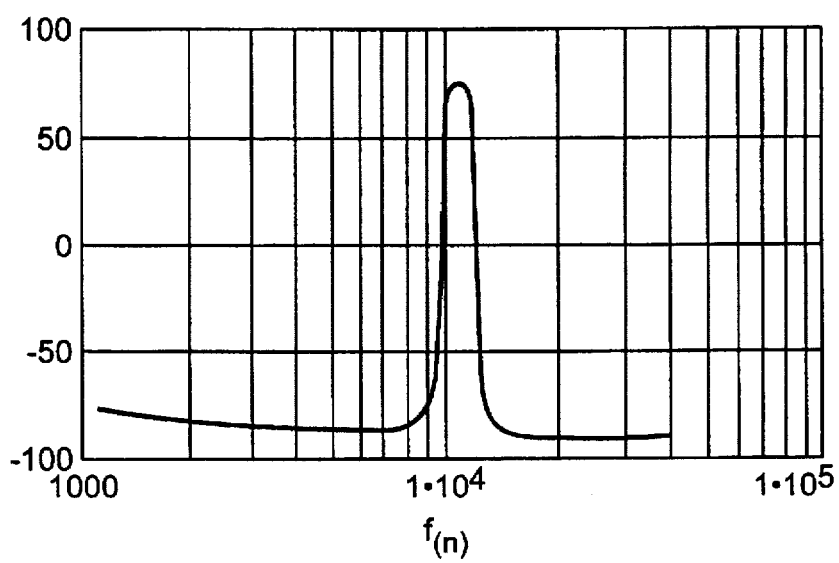
Figure 5:
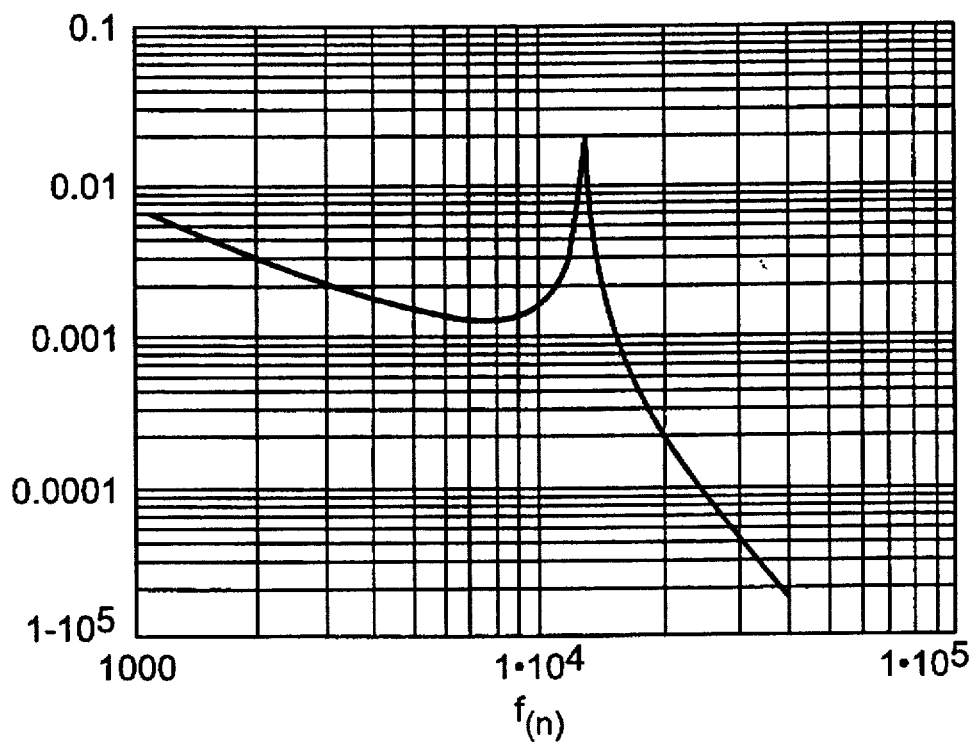
FIGS. 5 and 6 are graphs of Bode plots of frequency responses of the feedback control circuitry of FIG. 2.
Figure 6:
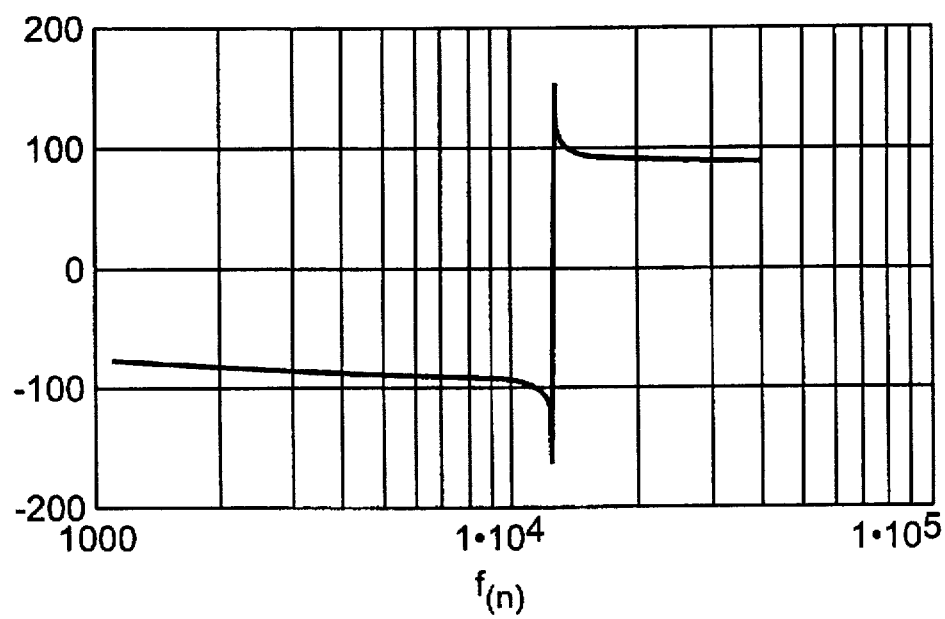
Figure 8:
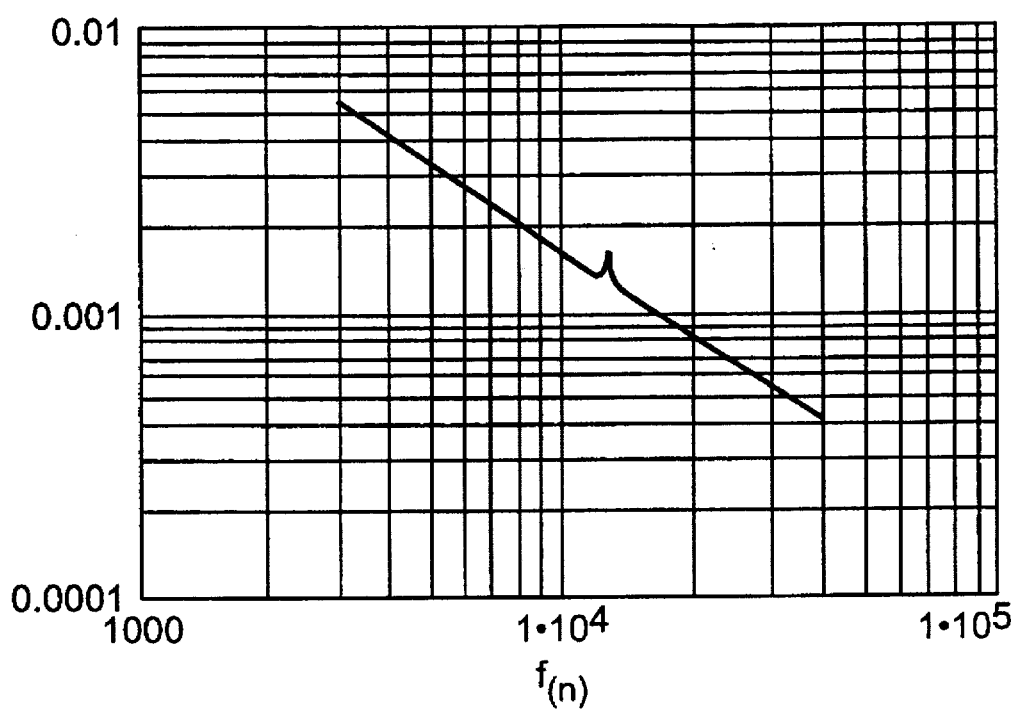
FIGS. 8 and 9 are graphs of Bode plots of frequency responses of the feedback control circuitry of FIG. 7.
Figure 9:
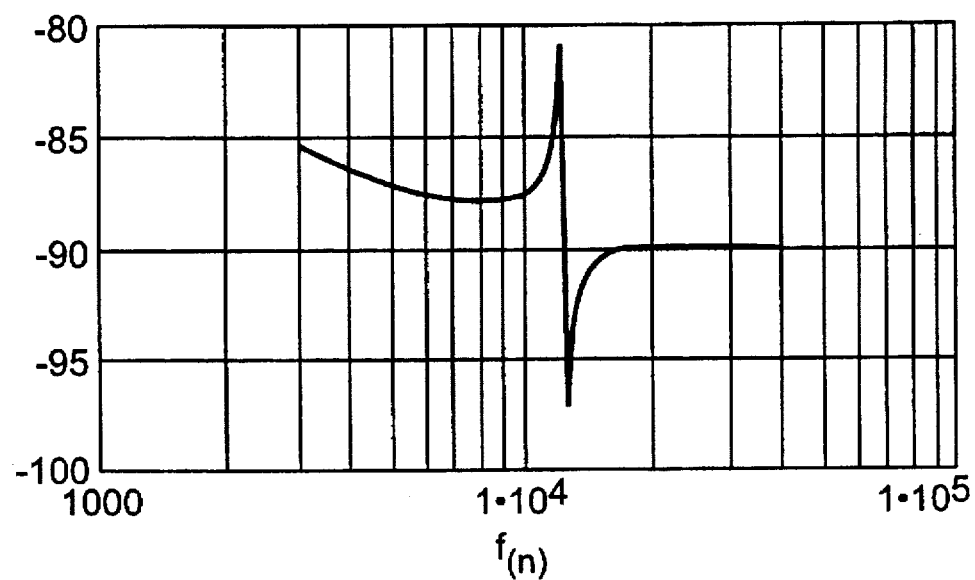

This arrangement improves the dynamics of the current control loop by utilizing the two sense resistors, one on each side of capacitor $C_2$ as shown in FIG. 7. If the resistors $R_{sense,left}$ and $R_{sense,right}$ are proportioned according to the equation:

$$\frac{R_{sense,left}}{R_{sense,right}} = \frac{L_1}{L_2} \quad (1)$$

then the control-loop poles and zeroes introduced by the EMI filter are essentially canceled, resulting in the stability-conforming Bode plots shown in FIGS. 8 and 9. From a power factor perspective, the circuit in FIG. 7 is a modest improvement over that in FIG. 1 because only a fraction of the current in capacitor $C_2$ is sensed by $R_{sense,left}$. If, however, the resistor $R_{sense,left}$ is made greater than the value indicated by Equation (1), then control loop instability is likely to result.

Figure 10:
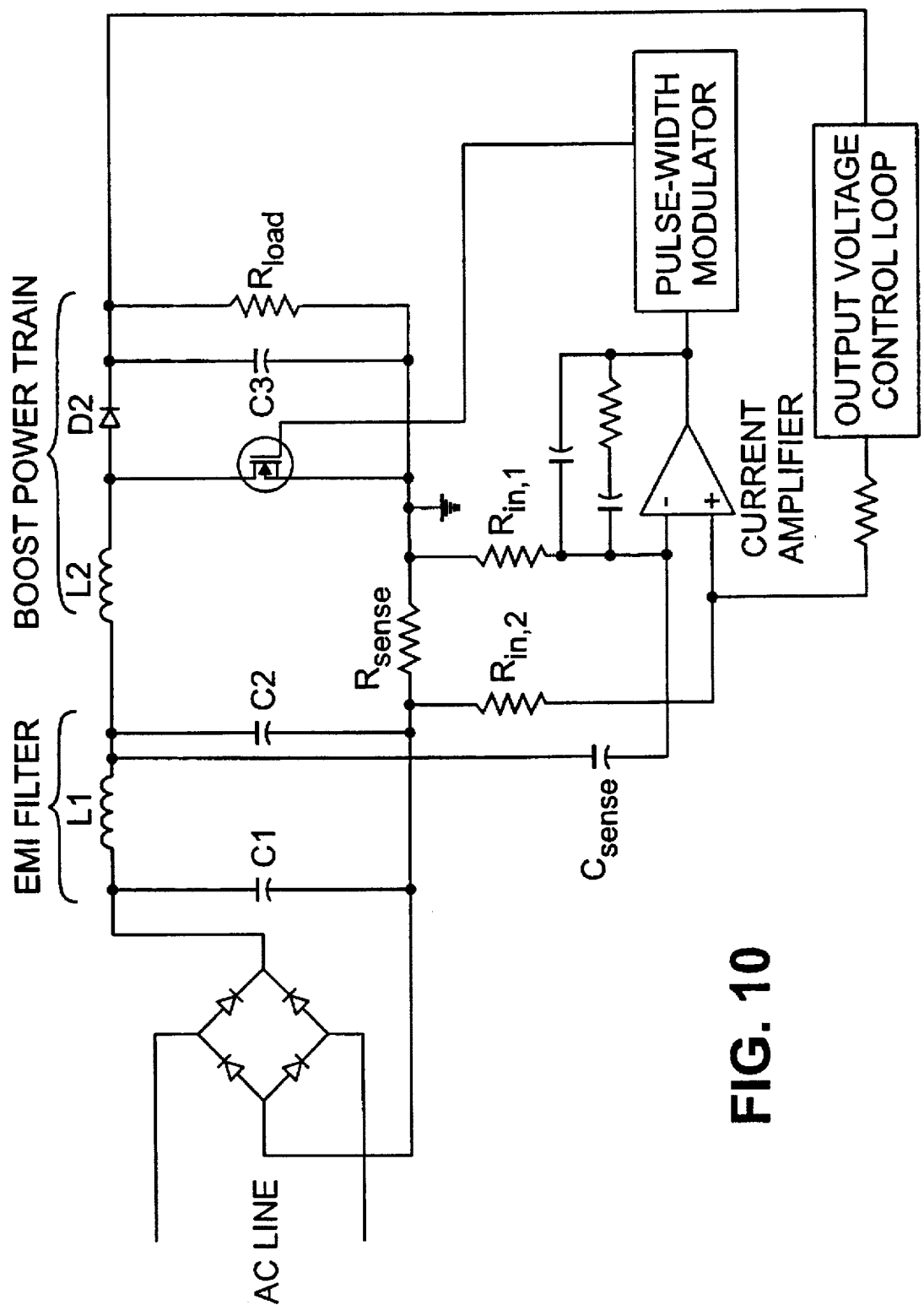
FIGS. 10 and 11 are circuit schematics of alternative power factor control arrangements having capacitor sense arrangements in accord with the invention.

A substantially better implementation can be obtained by recognizing that a functionally equivalent alternative to sensing capacitor current with a sense resistor is to emulate capacitor current by a sense capacitor $C_{sense}$ connected as shown on FIG. 10. In this circuit the left hand sense resistor $R_{sense,left}$ is removed and the sense capacitor $C_{sense}$ is connected between a node common to the filer inductor $L_1$ and the boost inductor $L_2$ and the current amplifier. The sense capacitor $C_{sense}$ adds a current to the input to the current control loop operational amplifier which represents the equivalent of the signal that would have been generated by a sense resistor $R_{sense,left}$ due to the current in capacitor $C_2$. The required equivalence between $R_{sense,left}$ and $C_{sense}$ is given by:

$$R_{sense,left} = \frac{C_{sense} \times R_{in}}{C_2} \quad (2)$$

Providing a capacitor sense process for the current in $C_2$ has the same effect on control-loop stability as providing a sense resistor to the left of $C_2$. Similar to Equation (1), pole-zero cancellation for the low pass EMI filter occurs when:

$$C_{sense} = \frac{L_1 \times C_2 \times R_{sense,right}}{L_2 \times R_{in}} \quad (3)$$

Values of $C_{sense}$ larger than that represented by Equation (3) will likely result in control loop instability due to the introduction of a double pole at a lower frequency than a double zero.

Figure 11:
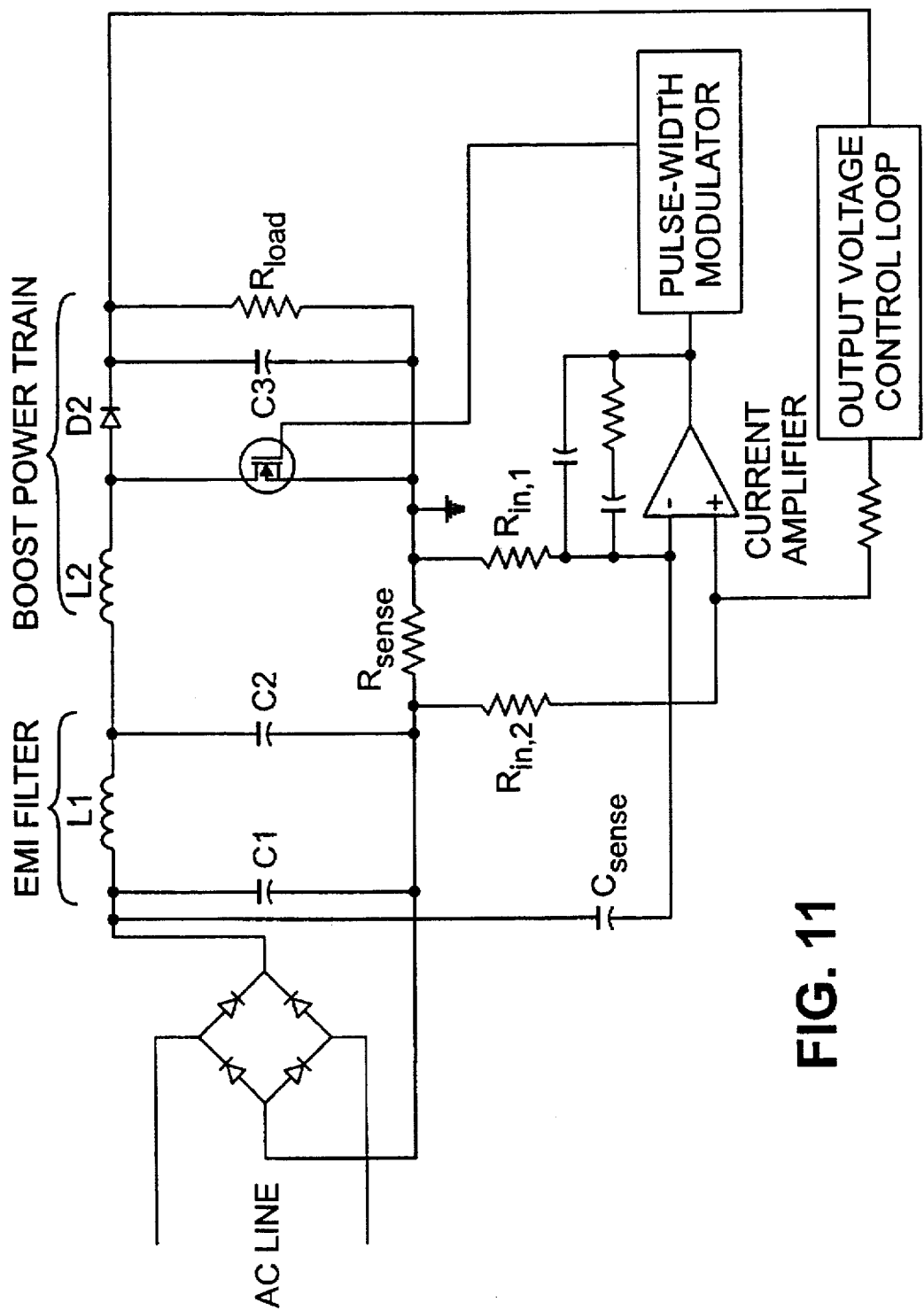

However, using a sense capacitor to compensate for the current in $C_1$ and/or $C_2$ provides a new opportunity to avoid the control loop instability produced by a sense resistor connected to the left of capacitor $C_2$. By connecting the sense capacitor to the left of the EMI filter, i.e., on the ac line side as shown in FIG. 11, rather than directly to the top of $C_2$, it is de-coupled from the EMI filter reactive elements, and no stability issues result because it is now feed forward to the control loop. Thus the current in any or all differentially connected capacitors can be included in the power factor control process without the stability-affecting magnitude restrictions on $R_{sense,left}$, while, at the same time, maintaining the necessary bandwidth for accurate reproduction of the current wave form. The required value for the capacitor $C_{sense}$ is given by:

$$C_{sense} = \frac{C_{sum} \times R_{sense}}{R_{in}} \quad (4)$$

where $C_{sum}$ is the sum of the differentially connected EMI capacitors to be compensated.

In a practical implementation of the capacitor sense circuit, a resistor divider would be used (with a divider ratio typically of 100:1 or more) to reduce the exposure of the operational amplifier to ac line transients. With such a divider, the value of the sense capacitor should be increased by a factor of the divider ratio.

The invention claimed is:

1. A switched-mode rectifier adapted to operate with an improved power factor by compensating for reactive currents present in a capacitive branch of an associated EMI line filter, said switched-mode rectifier comprising:

an AC rectifier energized from an AC line source having an input voltage;

an EMI filter connected to the output of said AC rectifier and comprising a series inductor ($L_1$) and one or more differentially connected capacitor legs;

a switching power converter connected to the opposite side of said EMI filter and comprising:

a boost inductor ($L_2$), an output capacitor for creating a filtered output voltage for a load, and a power switch for controlling current in said boost inductor ($L_2$); and a power factor correction circuit comprising:

means connected to said load for regulating the level of said filtered output voltage;

first and second current-sensing resistors serially connected in a return lead of said switching power converter, said current-sensing resistors being located on opposite sides of a node associated with said one or more differentially connected capacitor legs;

the ratio of the resistance values of said first and second current-sensing resistors being determined by the relationship:

$$R_{sense\ left}/R_{sense\ right} = L1/L2$$

an amplifier responsive to the level of said filtered output voltage and connected to sense the combined voltages across said first and second current-sensing resistors, said sensed voltage having a component representative of current through said one or more differentially connected capacitor legs of said EMI filter; and a pulse width modulator connected to said power switch and responsive to the output of said amplifier and to said filtered output voltage level for regulating the duty cycle of said power switch, thereby to maintain input current and input voltage of said AC line source substantially in-phase and to replicate the waveform of said input voltage.

2. Apparatus in accordance with claim 1, wherein said power factor correction circuit comprises:

means connected to said load for regulating the level of said filtered output voltage;

a voltage-sensing capacitor connected to a node of said series inductor ($L_1$) to sense voltage at said node;

a current-sensing resistor connected to sense an input current of said switching power converter;

an amplifier responsive to the level of said filtered output voltage and connected to sense the combined signals across said voltage-sensing capacitor and said current-sensing resistor, said sensed signals having a component representative of current through said one or more differentially connected capacitor legs of said EMI filter; and a pulse width modulator connected to said power switch and responsive to the output of said amplifier and to said filtered output voltage level for regulating the duty cycle of said power switch, thereby to maintain input current and input voltage of said AC line source substantially in-phase and to replicate the waveform of said input voltage.

3. A power factor correction circuit as claimed in claim 2, wherein:

said voltage-sensing capacitor is connected to a node common to the output of said AC rectifier and the input of said EMI filter.

4. A switched-mode rectifier adapted to operate with an improved power factor by compensating for reactive currents present in a capacitive branch of an associated EMI line filter, said switched-mode rectifier comprising:

an AC rectifier energized from an AC line source having an input voltage, said AC rectifier providing a source of DC current;

an EMI filter connected between said AC line and said switch-mode rectifier and comprising one or more differentially connected capacitor legs;

a switching power converter connected to the opposite side of said EMI filter and comprising:

a boost inductor;

an output capacitor for creating a filtered output voltage for a load, and a power switch for controlling current in said boost inductor; and a power factor correction circuit comprising:

means connected to said load for regulating the level of said filtered output voltage;

a voltage-sensing capacitor connected to a node associated with said one or more differentially connected capacitor legs, said node being selected to enable said capacitor to continuously estimate from said sensed voltage a component of current in said differential EMI capacitors;

a current-sensing resistor connected to sense an input current of said switching power converter;

an amplifier responsive to the level of said filtered output voltage and connected to sense the combined signals across said voltage-sensing capacitor and said current-sensing resistor, said sensed signals having a component representative of current through said one or more differentially connected capacitor legs of said EMI filter; and a pulse width modulator connected to said power switch and responsive to the output of said amplifier and to said filtered output voltage level for varying the on-off cycle of said power switch to maintain input current and input voltage of said AC line source substantially in-phase.

* * * * *